July 2, 1929.  W. S. SEARLES  1,718,986
OPHTHALMIC MOUNTING
Filed March 1, 1922

Inventor
Wayne S. Searles
By Howard E. Barlow
Attorney

Patented July 2, 1929.

1,718,986

UNITED STATES PATENT OFFICE.

WAYNE S. SEARLES, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

OPHTHALMIC MOUNTING.

Application filed March 1, 1922. Serial No. 540,278.

This invention relates to improvements in the construction of temple joints for ophthalmic mountings, and has for its object to provide a one-piece temple joint member comprising a spur member having a barbed shank adapted to be forced into a nonmetallic material and having a pair of spaced-apart pivot bearing ears formed integral with its outer end thus providing a one-piece metal temple joint member which is extremely strong and durable in construction and which when inserted into position may be so imbedded into the non-metallic portion of the mounting as to be invisible when the temple members are swung to open or operative position.

With these and other objects in view, the invention consists of certain novel features of construction, as will be more fully described, and particularly pointed out in the appended claims.

Figure 1:
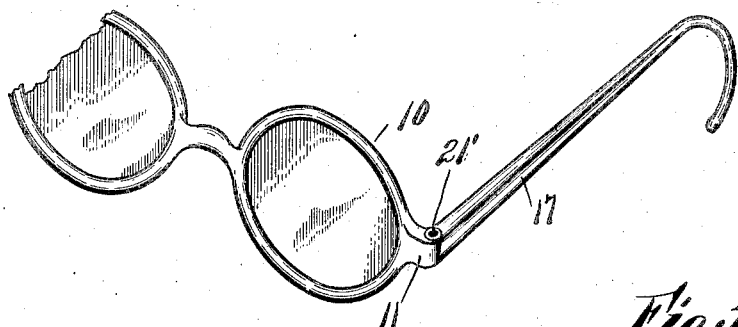
Figure 1 is a perspective view showing a non-metallic spectacle frame in which my improved temple joint is employed and which is practically covered by a non-metallic material so as to hide the joint when the temple is in open position.
Figure 5:
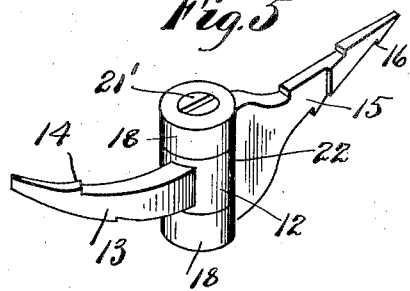
Figure 5 is a perspective view showing the two members of the joint interlocking one with the other.
Figure 2:
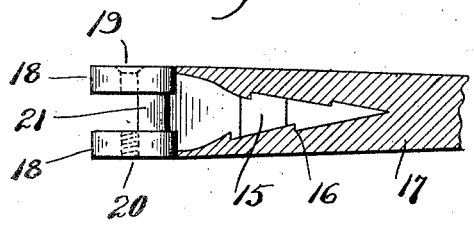
Figure 2 is an enlarged view of my improved temple joint showing the non-metallic stock of the temple into which the spur portion of the joint is imbedded.
Figure 3:
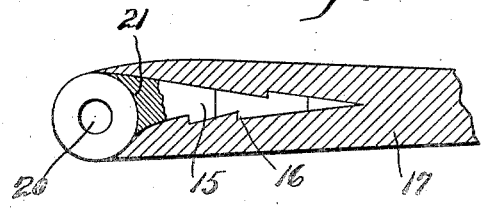
Figure 3 is a top view of my improved joint partially in section showing the spur as imbedded into the temple.
Figure 4:
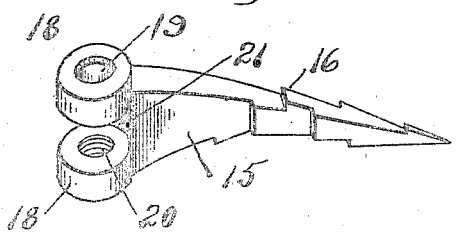
Figure 4 is a perspective view of my improved one-piece temple joint member showing the retaining barbs on the different faces of the shank.

With reference to the drawings, 10 designates the usual spectacle frame which is formed either wholly or in part of non-metallic material such for instance as celluloid, zylonite or other suitable material and to the outer ends of this frame member are hinged the temple members, the male member 12 of the joint being provided with a curved shank 13 preferably barbed as at 14 to be inserted or imbedded into the end member of the frame, and which is grooved to receive it as shown in Figure 1, is adapted to be engaged by the female member of the joint which latter member is provided with a pair of spaced-apart pivot ears.

In some instances in the old style frame the female portion of the joint is formed by slotting the end of the non-metallic temple to form a recess for the reception of the male portion of the joint and in some other cases these non-metallic joint ears on either side of the slot are provided with metallic bushings, but in both of these cases these non-metallic pivot ears are not sufficiently strong to withstand the usual twisting strains and often break. In some cases separate metallic ear members are inserted into the ends of these non-metallic temples which have not proven entirely satisfactory.

My improved construction contemplates the forming of the female member of the joint complete and entirely of one piece of metal and providing the same with a spur 15 preferably barbed in staggered relation on several of its faces as at 16 and adapted to be inserted into the end of a non-metallic temple 17. The outer end of this spur is provided with a pair of spaced-apart joint ears 18, one of which is drilled as at 19 while the opposite ear is drilled and tapped as at 20 to receive between them the usual pivot screw 21'; also in order to stiffen the joint when the two members thereof are connected together I have finished the inner surface 21 between the two ears 18 on the arc of a circle to fit the correspondingly finished surface 22 of the male member thereby increasing the bearing surface of the two members rendering the joint very strong, stiff and durable to stand excessive strains which it may be subjected to.

My improved one-piece metal temple joint is extremely strong and durable in construction, is simple and practical to manufacture and by cooperating with the male portion of the joint provides a very rigid joint which will withstand the excessive strains which are brought to bear upon the same. This one-piece female joint member by being formed entirely of metal may be made very small and well adapted to be deeply imbedded into the end of the temple member and practically covered and inclosed by the non-metallic portion of the temple so that the metal joint will be practically invisible when the temple is swung to open or operative position.

The foregoing description is directed solely towards the construction illustrated, but I desire it to be understood that the shank 15 with its female bearing member which enters the temple and the shank 13 with its male bearing member which enters the end piece may be reversed and that I reserve the privilege of resorting to all the mechanical changes to which the device is susceptible, the invention being defined and limited only by the terms of the appended claims.

I claim:

1. A metallic joint for a non-metallic spectacle comprising a male and a female member, the female member having a barbed shank adapted to be inserted into the non-metallic material and having a pair of spaced-apart pivot bearing ears formed integral with its outer end to receive the male member between them, the stock joining said bearing ears being formed on the concave arc of a circle to serve as a continuous bearing seat for the abutting outer surface of said male member, in all of its different positions.

2. A metal temple joint member for non-metallic spectacles comprising a spur member having more than two faces and pointed at one end to be forced into the non-metallic end of the temple, barbs on more than two of the faces to assist in holding the spur in the temple, and a pivot bearing on the outer end of said spur.

3. A metal temple joint member for non-metallic spectacles comprising a spur member having a plurality of faces and pointed at one end to be forced into the non-metallic end of the temple, barbs on more than two of the faces of said spur to assist in holding the spur in the temple, said barbs being arranged in staggered relation, and a pivot bearing on the outer end of said spur.

4. A metal temple joint member for non-metallic spectacles comprising a spur member having a plurality of faces and pointed at one end to be forced into the non-metallic end of the temple, barbs on each of the faces of said spur to assist in holding the spur in the temple, said barbs on adjacent faces being arranged in staggered relation, and a pivot bearing on the outer end of said spur.

In testimony whereof I affix my signature.

WAYNE S. SEARLES.